United States Patent
Draffin (10) Patent No.: US 12,054,861 B2
(45) Date of Patent: Aug. 6, 2024

(54) LAYERED THERMAL INSULATION SYSTEM AND THERMAL INSULATION PRODUCTS FABRICATED THEREFROM

(71) Applicant: MEI Group Pty Ltd, Canning Vale (AU)

(72) Inventor: Jeremy Draffin, Canning Vale (AU)

(73) Assignee: MEI Group Pty Ltd, Canning Vale (AU)

( * ) Notice: Subject to any disclaimer, the term of this patent is extended or adjusted under 35 U.S.C. 154(b) by 305 days.

(21) Appl. No.: 17/121,522

(22) Filed: Dec. 14, 2020

(65) Prior Publication Data

US 2022/0186414 A1    Jun. 16, 2022

(51) Int. Cl.
  *D04H 1/4218*    (2012.01)
  *B32B 5/24*    (2006.01)
  *D04H 1/4234*    (2012.01)

(52) U.S. Cl.
  CPC ............. *D04H 1/4218* (2013.01); *B32B 5/24* (2013.01); *D04H 1/4234* (2013.01)

(58) Field of Classification Search
  CPC ...... D04H 1/4218; D04H 1/4234; B32B 5/24; Y10T 442/2423; Y10T 442/3431; Y10T 442/3439
  See application file for complete search history.

(56) References Cited

U.S. PATENT DOCUMENTS

| 4,273,365 A * | 6/1981 | Hagar | F16L 51/021 442/233 |
| 2007/0092688 A1* | 4/2007 | Doesburg | B29C 44/321 428/95 |
| 2010/0209663 A1* | 8/2010 | Grall | B32B 3/10 156/253 |
| 2015/0260330 A1* | 9/2015 | Tortorello | F16L 59/029 428/601 |
| 2021/0316177 A1* | 10/2021 | Ahlers | F16L 5/04 |

FOREIGN PATENT DOCUMENTS

JP    2008248771 A    * 10/2008

OTHER PUBLICATIONS

English translation to JP-2008248771-A to Iwaki obtained from PE2E (Year: 2008).*

* cited by examiner

*Primary Examiner* — Jeremy R Pierce
(74) *Attorney, Agent, or Firm* — Osha Bergman Watanabe & Burton LLP (57) ABSTRACT

A layered thermal insulation system generally conformable to three-dimensioned surfaces of heat-producing elements in need of insulation is described. The system comprises:
  i) an inner high temperature resistant insulation layer;
  ii) an outer high temperature resistant insulation layer adjacent the inner high temperature resistant insulation layer; and,
  iii) a first reflection layer and a second reflection layer. Each of said reflection layers is formed of a material selected from a group consisting of metal foils and are provided with a plurality of dimples and/or protrusions. The first reflection layer is adjacent the inner high temperature insulation layer such that, in use, an opposing surface thereof is in close proximity to said surfaces of said element to be insulated. The second reflection layer is adjacent to the outer high temperature insulation layer such that, in use, an opposing surface thereof comprises an exposed surface having a lower temperature than said surfaces of said element.

14 Claims, 5 Drawing Sheets

LAYERED THERMAL INSULATION SYSTEM AND THERMAL INSULATION PRODUCTS FABRICATED THEREFROM

TECHNICAL FIELD

The disclosure relates to a layered thermal insulation system and thermal insulation products fabricated therefrom, in particular removable covers for elements of heat producing equipment such as engines, exhaust manifolds, turbochargers, turbines, exhausts, mufflers, electrical conduits, valves, pipework and so forth.

BACKGROUND

The discussion of the background to the disclosure is intended to facilitate an understanding of the disclosure. However, it should be appreciated that the discussion is not an acknowledgement or admission that any of the material referred to was published, known or part of the common general knowledge as at the priority date of the application.

Heat producing elements of plant and equipment may present a fire risk hazard. For example, in operation, the external surfaces of heat producing elements of plant and equipment such as engine manifolds, turbochargers, exhaust and muffler groups may exceed 650° C. and therefore provide a fire ignition risk in the presence of a combustible fluid such as transmission fluids, hydraulic fluids, engine oils and grease which have flash points in the range of 266° C.-180° C. Consequently, it is prudent to develop and implement fire mitigation principles, such as mitigating the heat source and eliminating the fuel source, to reduce the severity and likelihood of a fire event.

It is common to wrap lagging or thermal insulation around exposed surfaces of heat producing elements of plant and equipment to reduce the temperature at the exposed surfaces and thereby mitigate the heat source that they present. Such lagging and thermal insulation is frequently fabricated from woven materials so that it is sufficiently flexible as well as thermally insulating. In the event of a leakage of combustible fluids, however, the woven materials tend to absorb the combustible fluids, thereby increasing the risk of a fire event.

Additionally, the known thermal insulation covers may restrict air flow around external surfaces of heat producing elements, thereby contributing to over-heating.

Furthermore, there is often poor coverage of critical areas around heat producing elements.

The layered thermal insulation system and thermal insulation products fabricated therefrom as described herein seeks to overcome at least some of the problems described above.

SUMMARY

The disclosure provides a layered thermal insulation system and thermal insulation products fabricated therefrom, in particular removable covers for elements of heat producing equipment such as engines, exhaust manifolds, turbochargers, turbines, exhausts, mufflers, electrical conduits, valves, pipework and so forth.

In one aspect of the disclosure there is provided a layered thermal insulation system, wherein said system is generally conformable to three-dimensional surfaces of a heat-producing element to be insulated, the system comprising:
  i) an inner high temperature resistant insulation layer;
  ii) an outer high temperature resistant insulation layer adjacent the inner high temperature resistant insulation layer; and,
  iii) a first reflection layer and a second reflection layer, each of said reflection layers being formed of a metal foil, the first reflection layer being adjacent the inner high temperature insulation layer such that, in use, an opposing surface thereof is in close proximity to said surfaces of said element to be insulated, the second reflection layer being adjacent the outer high temperature insulation layer such that, in use, an opposing surface thereof comprises an exposed surface having a lower temperature than said surfaces of said element.

In one embodiment, in use, the exposed surface of the layered thermal insulation system may have a temperature of less than 150° C. when said surface of the heat-producing element has a temperature of up to 650° C.

In one embodiment, the inner high temperature resistant insulation layer comprises a woven fibrous material comprising inorganic fibres. The inorganic fibres may be selected from a group comprising silica fibres, glass fibres, silica glass, e-glass, refractory ceramic fibres, mineral wool fibres or mixtures thereof. In one particular embodiment, the inorganic fibres may be silica glass fibres.

The inner high temperature resistant insulation layer may have a thickness of from about 0.77 mm to about 1.3 mm.

In one particular embodiment, the inner high temperature resistant insulation lay comprises a reinforced silica glass fabric. The silica glass fabric may be reinforced with stainless steel wire.

In one embodiment, the outer high temperature resistant insulation layer comprises a non-woven fibrous material comprising inorganic fibres. The inorganic fibres may be selected from a group comprising silica fibres, glass fibres, silica glass, e-glass, refractory ceramic fibres, mineral wool fibres or mixtures thereof.

In one embodiment, the outer high temperature resistant insulation layer may have a density of 250 kg·m$^{-3}$ or less, in particular 180 kg·m$^{-3}$ or less.

In another embodiment, the outer high temperature resistant insulation layer may have a thermal conductivity of from about 0.13 W/m*K to about 0.03 W/m*K in a temperature range of from 650° C. to 200° C.

In a further embodiment, the outer high temperature resistant insulation layer may have a thickness of from about 17 mm to about 24 mm.

In some embodiments, the first and second reflection layers may be provided with a plurality of protrusions and/or dimples therein. The plurality of protrusions and/or dimples may have a diameter of from about 7 mm to about 12 mm and a height/depth of from about 2 mm to about 3 mm. The plurality of protrusions and/or dimples may extend continuously across said reflection layers at a density of from 5,000 protrusions and/or dimples to 10,000 protrusions and/or dimples per square metre, in particular about 6,000 to about 7,000 protrusions and/or dimples per square meter.

In another embodiment, the first and second reflection layers and the outer high temperature resistant insulation layer may each have a width and a length exceeding that of the inner high temperature resistant insulation layer. In one embodiment, the first and second reflection layers and the inner high temperature resistant insulation layer may extend beyond each edge of the outer high resistant insulation layer by an amount sufficient for the first and second reflection layers and the inner high temperature resistant insulation layer to be fastened together.

In some embodiments, the first and second reflection layers and the outer high temperature resistant insulation layer may be fastened together with stitches of heat resistant thread, such as Kevlar, optionally combined with stainless steel thread.

In another aspect the disclosure provides a thermal insulation product fabricated from the layered thermal insulation system as defined above, when used as a removable cover for an element of heat producing equipment. Said elements may be selected from a group comprising engines, exhaust manifolds, turbochargers, turbines, exhausts, mufflers, electrical conduits, valves, pipework and so forth.

In one embodiment, the thermal insulation product further comprises one or more releasable fasteners.

BRIEF DESCRIPTION OF DRAWINGS

Notwithstanding any other forms which may fall within the scope of the process as set forth in the Summary, specific embodiments will now be described with reference to the accompanying figures below.

In the drawings like structures are referred to by like numerals throughout the several views. The drawings shown are not necessarily to scale, with emphasis instead generally being placed upon illustrating the principles of the present invention.

DESCRIPTION OF EMBODIMENTS

The disclosure relates to a layered thermal insulation system and thermal insulation products fabricated therefrom, in particular removable covers for elements of heat producing equipment such as engines, exhaust manifolds, turbochargers, turbines, exhausts, mufflers, electrical conduits, valves, pipework and so forth.

General Terms

Throughout this specification, unless specifically stated otherwise or the context requires otherwise, reference to a single step, composition of matter, group of steps or group of compositions of matter shall be taken to encompass one and a plurality (i.e. one or more) of those steps, compositions of matter, groups of steps or groups of compositions of matter. Thus, as used herein, the singular forms "a", "an" and "the" include plural aspects unless the context clearly dictates otherwise. For example, reference to "a" includes a single as well as two or more; reference to "an" includes a single as well as two or more; reference to "the" includes a single as well as two or more and so forth.

Each example of the present disclosure described herein is to be applied mutatis mutandis to each and every other example unless specifically stated otherwise. The present disclosure is not to be limited in scope by the specific examples described herein, which are intended for the purpose of exemplification only. Functionally-equivalent products, compositions and methods are clearly within the scope of the disclosure as described herein.

The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.).

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Reference to positional descriptions, such as lower and upper, are to be taken in context of the embodiments depicted in the figures, and are not to be taken as limiting the invention to the literal interpretation of the term but rather as would be understood by the skilled addressee.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The term "and/or", e.g., "X and/or Y" shall be understood to mean either "X and Y" or "X or Y" and shall be taken to provide explicit support for both meanings or for either meaning.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the present specification, including definitions, will control. In addition, the materials, methods, and examples are illustrative only and not intended to be limiting.

The term "about" as used herein means within 5%, and more preferably within 1%, of a given value or range. For example, "about 3.7%" means from 3.5 to 3.9%, preferably from 3.66 to 3.74%. When the term "about" is associated with a range of values, e.g., "about X % to Y %", the term "about" is intended to modify both the lower (X) and upper (Y) values of the recited range. For example, "about 20% to 40%" is equivalent to "about 20% to about 40%".

Layered Thermal Insulation System

Figure 1:
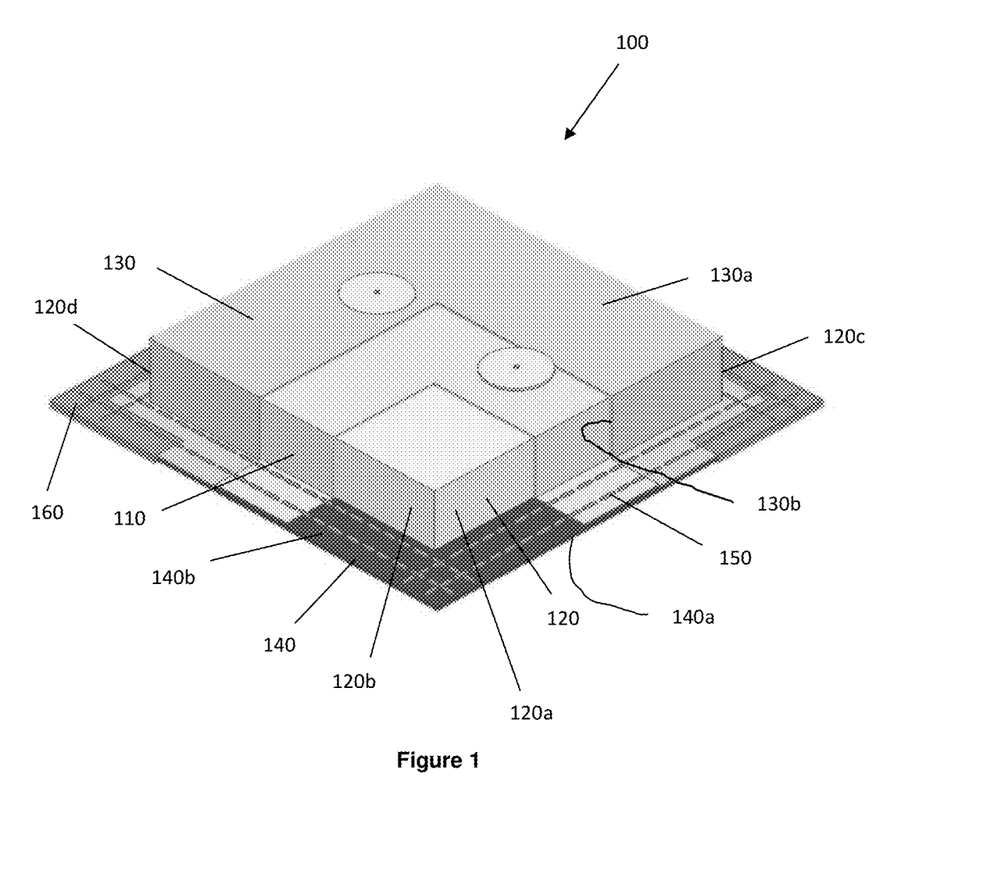
FIG. 1 is a representative view of a layered thermal insulation system according to one embodiment of the disclosure.

Referring to FIG. 1 there is shown an embodiment of a layered thermal insulation system 100 for use as a removable cover for an element of heat producing equipment such as engines, exhaust manifolds, turbochargers, turbines, exhausts, mufflers, electrical conduits, valves, pipework and so forth.

The layered thermal insulation system 100 is generally conformable to three-dimensional surfaces of the heat producing equipment described above and may be fabricated as thermal insulation covers therefor. Although the surfaces of the element may be at a temperature of up to 650° C., when covered by products fabricated from the layered thermal insulation system 100 as described herein, the temperature at an exposed surface thereof may be reduced to less than 150° C. Consequently, in the event that a combustible fluid such as a transmission fluid, hydraulic fluid, engine oil and grease (which have flash points in the range of 266° C.-180° C.) comes into contact with the exposed surface of the layered thermal insulation system, the risk of ignition is significantly reduced.

The layered thermal insulation system 100 includes an inner high temperature resistant insulation layer 110, an outer high temperature resistant insulation layer 120 disposed adjacent to the inner high temperature resistant insulation layer 110, a first reflection layer 130 and a second reflection layer 140.

Generally, the inner high temperature resistant layer 110 is proximal said surface of the heat producing element and the outer high temperature resistant insulation layer 120 overlays the inner high temperature resistant insulation layer 110.

The inner high temperature resistant insulation layer 110 comprises a woven fibrous material comprising inorganic fibres. The inorganic fibres may be selected from a group comprising silica fibres, glass fibres, silica glass, e-glass, refractory ceramic fibres, mineral wool fibres or mixtures thereof. In particular, the inorganic fibres may be resistant to elevated temperatures of up to 1000° C. In other words, the integrity and various attributes of the woven fibrous material such as strength, flexibility, thermal conductivity and so forth, are not detrimentally affected by continuous exposure to elevated temperatures of up to 1000° C.

In one particular example, the inner high temperature resistant insulation layer 110 comprises a reinforced woven glass fabric, in particular a stainless steel wire reinforced silica glass fabric. The tensile strength of such reinforced woven glass fabric may be from 900 N/cm to 930 N/cm.

The outer high temperature resistant thermal insulation layer 120 comprises a non-woven fibrous material comprising inorganic fibres. The inorganic fibres may be selected from a group comprising silica fibres, glass fibres, silica glass, e-glass, refractory ceramic fibres, mineral wool fibres or mixtures thereof. In particular, the non-woven fibrous material may be a needled mat of silica glass fibres, such as high silica glass (95.0%) or e-glass (alkali content<1.0%).

The outer high temperature resistant thermal insulation layer 120 may have a thickness of from about 17 mm to about 24 mm. In this way, said layer 120 is not so thick that it impedes said system 100 from being generally conformable to the three dimensional surfaces of heat-producing elements in need of thermal insulation, and said layer 120 is not so thin that it compromises the effectiveness of thermal insulation provided by said system 100.

The outer high temperature resistant insulation layer 120 may have a density in a range of about 250 kg·m$^{-3}$ to about 100 kg·m$^{-3}$. For example, said density may be less than about 250 kg·m$^{-3}$, be less than about 180 kg·m$^{-3}$, less than about 166 kg·m$^{-3}$, less than about 150 kg·m$^{-3}$, less than about 132 kg·m$^{-3}$, less than 120 kg·m$^{-3}$ or about 100 kg·m$^{-3}$.

The density of the outer high temperature resistant insulation layer 120 influences the thermal conductivity (W/m*K) of said layer 120 with increasing temperature. For example, Tables 1 and 2 which correspond to the thermal conductivities of high silica glass needled mats and e-glass needled mats, respectively, demonstrate that thermal conductivity increases with increasing temperature for a specific density. Moreover, thermal conductivity decreases with increasing density at constant temperature.

The outer high temperature resistant insulation layer 120 is selected to have a thermal conductivity of from about 0.13 W/M*K to about 0.03 W/m*K in a temperature range of from 650° C. to 200° C.

The first reflection layer 130 and the second reflection layer 140 are fabricated from a metal foil. Suitable examples of metal foils include, but are not limited to stainless steel foil and aluminium foil.

TABLE 1

| | Thermal conductivity, W/m*K | | | | | | |
|---|---|---|---|---|---|---|---|
| Temperature, ° C. | 200 | 300 | 400 | 500 | 600 | 700 | 800 |
| Density, 120 kg · m$^{-3}$ | 0.0534 | 0.065 | 0.0898 | 0.1225 | 0.1435 | 0.1932 | 0.2202 |
| Density, 150 kg · m$^{-3}$ | 0.052 | 0.065 | 0.082 | 0.098 | 0.119 | 0.148 | 0.175 |
| Density, 167 kg · m$^{-3}$ | 0.0568 | 0.0715 | 0.0902 | 0.1229 | 0.1396 | 0.1703 | 0.205 |
| Density, 180 kg · m$^{-3}$ | 0.0559 | 0.0698 | 0.0874 | 0.1088 | 0.1339 | 0.1629 | 0.1956 |

TABLE 2

| Temperature, °C. | Thermal conductivity, W/m*K | | | | | | |
|---|---|---|---|---|---|---|---|
| | 50 | 100 | 200 | 300 | 400 | 500 | 600 |
| Density, 100 kg·m$^{-3}$ | 0.0362 | 0.0404 | 0.0543 | 0.0752 | 0.1033 | 0.1386 | 0.1809 |
| Density, 120 kg·m$^{-3}$ | 0.0395 | 0.0435 | 0.557 | 0.0734 | 0.097 | 0.1258 | 0.1603 |
| Density, 150 kg·m$^{-3}$ | 0.0404 | 0.0443 | 0.0561 | 0.0734 | 0.0961 | 0.1242 | 0.1578 |
| Density, 166 kg·m$^{-3}$ | 0.0399 | 0.0436 | 0.0550 | 0.0716 | 0.0936 | 0.1209 | 0.1536 |
| Density, 180 kg·m$^{-3}$ | 0.0397 | 0.0435 | 0.0540 | 0.0687 | 0.0873 | 0.1100 | 0.1367 |

Generally, the metal foil has a thickness of from 0.77 mm to about 1.3 mm. In this way, the first and/or second reflection layers 130, 140 are sufficiently thin to be conformable to three dimensional surfaces of the heat producing equipment, while at the same time being sufficiently thick to withstand forces which would fracture and/or tear the first and/or second reflection layers 130, 140.

The first reflection layer 130 has a first surface 130a and a second opposing surface 130b. The first reflection layer 130 is disposed adjacent the inner high temperature insulation layer 110, such that the second opposing surface 130b is adjacent the inner high temperature insulation layer 110 and the first surface 130a is in close proximity to the three-dimensioned surface of the heat-producing element. In view of the thermal conductivity of the metal foil from which the first reflection layer 130 is formed, it will be appreciated that, in use, the temperature of the first reflection layer 130 may be marginally below the temperature of the heat-producing surface.

The second reflection layer 140 has a first surface 140a and a second opposing surface 140b. The second reflection layer 140 is disposed adjacent the outer high temperature insulation layer 120, such that the second opposing surface 140b is adjacent the outer high temperature insulation layer 120 and the first surface 140a is exposed.

One of the disadvantages of prior art thermal insulation systems is that such systems may retard insufficient air movement at the surface of heat producing elements which stifles heat convection. Consequently, the heat producing elements covered by such prior art thermal insulation systems can overheat. To improve air circulation at the surface of heat producing elements when covered by the layered thermal insulation system 100 described herein, the first and second reflection layers 130, 140 may be provided with a plurality of protrusions and/or dimples therein. The plurality of protrusions and/or dimples encourage formation of microturbulence at or proximal to the surface of the heat producing elements, thereby assisting heat convection and air-cooling of said surface.

Advantageously, the protrusions and/or dimples in the second reflection layer 140 increase the surface area of the first surface 140a, which enhances air-cooling of the exposed surface of the thermal insulation system 100 by more efficient heat convection.

The inventors have also found that the protrusions and/or dimples in the first and second reflections layers 130, 140 enable said layers 130, 140 to be repeatedly folded or bent without substantial loss of strength and integrity in comparison with continuous metal foils. Furthermore, the plurality of protrusions and/or dimples improve the lateral thermal conductivity of said layers 130, 140 in comparison to a smooth metal foil.

The protrusions and/or dimples may be embossed into the metal foil with an embossing machine. Each protrusion and/or dimple may have a diameter of from about 7 mm to about 12 mm and a height/depth of from about 2 mm to about 3 mm. It will be appreciated that the diameter and/or height/depth of the protrusions and/or dimples in the first and/or second reflection layers 130, 140 may be constant. Alternatively, there may be two or more different sized types of protrusions and/or dimples in the first and/or second reflection layers 130, 140 which differ from one another by the size of their respective diameters and/or height/depth.

The plurality of protrusions and/or dimples may extend in an array across said first and/or second reflection layers 130, 140 at a density of from 5,000 protrusions and/or dimples to 10,000 protrusions and/or dimples per square metre, particular about 6,000 to about 7,000 per square metre. It will be appreciated that the array may be continuous or intermittent and may adopt various patterns such as an irregular array or a regular array including, but not limited to, a triangular array, a square array or a hexagonal array.

In prior art thermal insulation systems, the exposed layer of such systems is frequently a woven fabric, such as glass lagging, titanium webbing, woven stainless steel wire, and so forth. A leak event or a hose failure may lead to ingress of oil or combustible liquids into such woven fabrics because they are readily absorbent. They may also potentially wick the oil or combustible liquids to the heat-producing surface, thereby providing an ignition risk.

By contrast, the second reflection layer 140 is non-absorbent and prevents passage of spilt combustible liquids through the various layers of said system 100, thereby considerably minimising the risk of ignition in the event of a leak or spillage in comparison to prior art thermal insulation systems.

The first and second reflection layers 130, 140 and the inner high temperature resistant insulation layer 110 may each have a width and a length exceeding that of the outer high temperature resistant insulation layer 120, as shown in FIG. 1. The first and second reflection layers 130, 140 and the inner high temperature resistant insulation layer 110 may extend beyond each edge 120a, 120b, 120c, 120d of outer high resistant insulation layer 110 by an amount sufficient for the first and second reflection layers 130, 140 and the inner high temperature resistant insulation layer 110 to be fastened together.

Generally, respective margins of the first and second reflection layers 130, 140 and the inner high temperature resistant insulation layer 110 may be fastened together with stitches 150 of heat resistant threading, such as Kevlar, in particular with steel reinforced Kevlar thread.

The margins may be bound with a binding 160 comprising a woven reinforced glass fabric. The glass fabric may be reinforced with stainless steel wire. Further, the reinforced glass fabric may be optionally coated with an elevated temperature (up to 200° C.) resistant coating. Suitable examples of such coatings may include, but are not limited to, silicone elastomers, PTFE and polyurethane.

Some embodiments of the system 10 may further comprise a stainless steel wire open loop material on the outermost surface of the first and second reflective layers 130, 140 and binding 160.

The arrangement of the inner and outer high temperature resistant insulation layers 110, 120 and the first and second reflection layers 130, 140 in the thermal insulation system 100 as described herein is capable of establishing a temperature gradient when used to cover elements of heat-producing equipment, whereby the temperature of the exposed surface of said system 100 will be lower than the temperature of the surface of the element of the heat-producing equipment. For example, the exposed surface of said system 100, when used to cover the surface of the heat-producing equipment, may be less than 150° C. even though the surface temperature of said element may be up to 650° C.

Thermal Insulation Product

Various thermal insulation products may be fabricated from the layered thermal insulation system 100 as described herein, in particular, the removable covers for an element of heat-producing equipment such as such as engines, exhaust manifolds, turbochargers, turbines, exhausts, mufflers, pipes and electrical conduits.

It will be appreciated that the size and shape of the thermal insulation product will substantially correspond to the three dimensional surface of the heat-producing element for which they are intended to cover.

Figure 2:
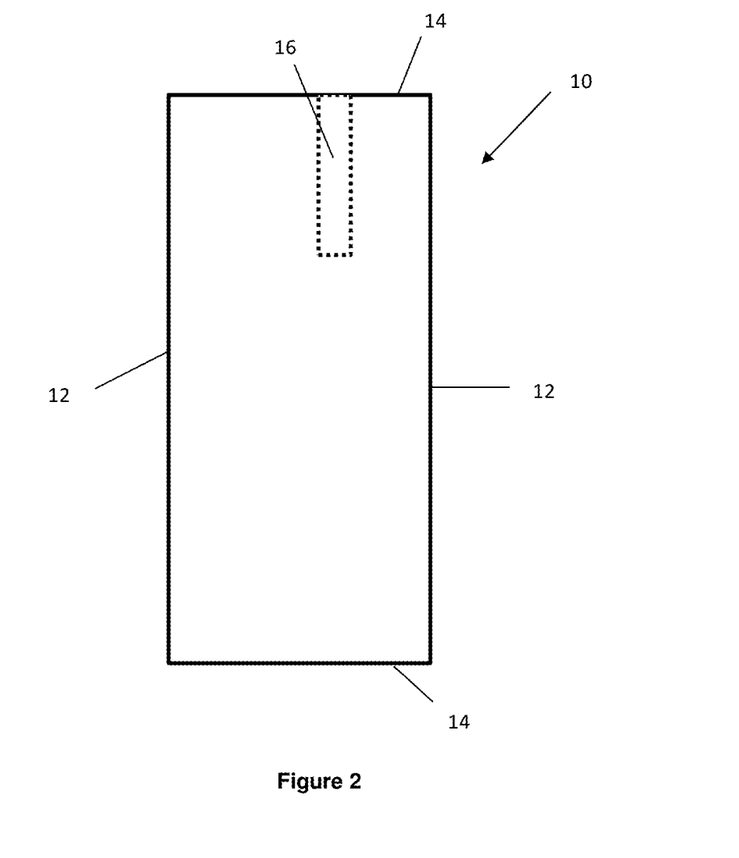
FIG. 2 is a schematic view of one embodiment of a thermal insulation cover fabricated from the layered thermal insulation system described herein that may be applied to elongate cylindrical heat-producing elements, such as pipes and exhausts.

For example, as shown in FIG. 2, the thermal insulation product for elongate cylindrical elements such as pipes, electrical conduits and exhausts may be a removable cover comprising an elongate rectangular sheet 10 fabricated from the layered thermal insulation system 100 which, in use, is wrapped around the elongate cylindrical element. The elongate rectangular sheet 10 has a pair of opposing parallel longitudinal sides 12 and a pair of opposing parallel lateral sides 14 substantially perpendicular to said pair of longitudinal sides 12.

In use, the rectangular sheet 10 may be applied to the elongate cylindrical element by disposing said longitudinal sides 12 in parallel alignment with the elongate cylindrical element, wherein the first surface 130 of the first reflection layer 130 is adjacent the external surface of the elongate cylindrical element. The elongate cylindrical element may then be encased by the rectangular sheet by wrapping one of the longitudinal sides 12 around the elongate cylindrical element to substantially conjoin or overlap the other of the longitudinal sides 12, such that the first surface 140a of the first reflection layer 140 is exposed.

The first surface 140a may be provided with one or more releasable fasteners to secure the rectangular sheet 10 around the elongate cylindrical element and aid ready removal thereof when repair and maintenance of the elongate cylindrical element is required. Suitable examples of releasable fasteners include, but are not limited to, one or more of straps, D-rings, tensioning springs, and hook and loop fasteners.

It will be appreciated that in some embodiments, for example for muffler inlets and clamps, it may be necessary to provide one or more cut out portions 16 in one or more lateral sides 14 of the rectangular sheet 10.

Figure 3:
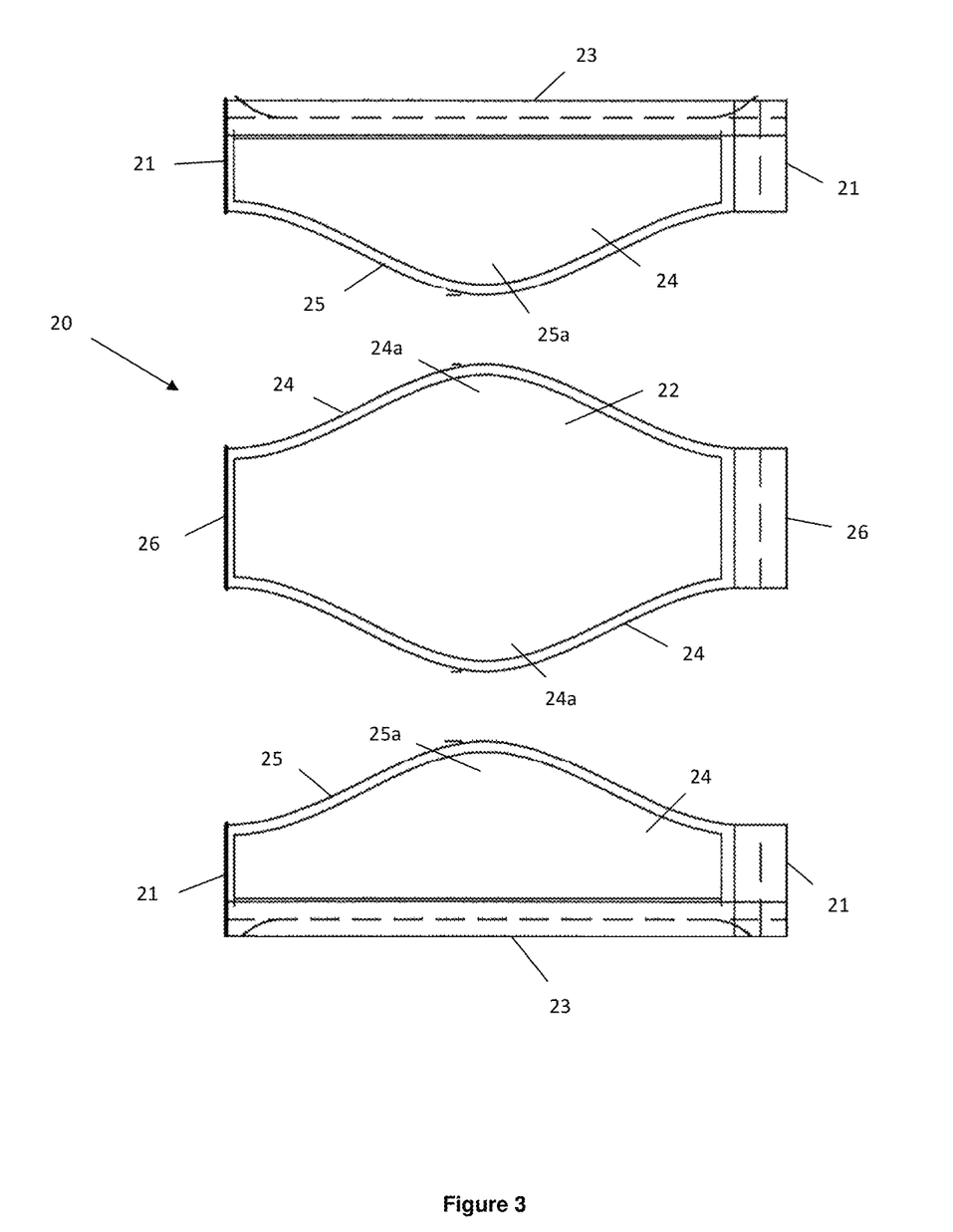
FIG. 3 is a schematic view of another embodiment of a thermal insulation cover fabricated from the layered thermal insulation system described herein that may be applied to elbows and bends of elongate cylindrical heat-producing elements, such as pipes and exhausts.

In an alternative embodiment, the shape of the thermal insulation product may be adapted to cover an elbow or bend in a pipe or conduit. In these particular embodiments, as shown in FIG. 3, the removable cover 20 comprises an intermediate portion 22 and opposing portions 24 which are mirror images of one another. The intermediate portion 22 comprises a pair of opposing parallel lateral sides 26 and a pair of opposing sinusoidal longitudinal sides 28 having a middle portion 28a wider than the lateral sides 26. Each opposing portion 24 comprises a pair of opposing parallel lateral sides 21, a straight longitudinal side 23 and an opposing sinusoidal longitudinal side 25 having a middle portion 25a wider than the lateral sides 21. The sinusoidal side 23 of each opposing portion 24 is stitched to a respective sinusoidal longitudinal side 28 of the intermediate portion 22.

In use, the removable cover 20 may be applied to the elbow by disposing said longitudinal side 23 in corresponding alignment with the elbow, wherein the first surface 130 of the first reflection layer 130 is adjacent the external surface of the elbow. The elbow may then be encased by the removable cover 20 by wrapping one of said longitudinal sides 23 around the elbow to substantially conjoin or overlap the other of the longitudinal sides 23, such that the first surface 140a of the first reflection layer 140 is exposed. The first surface 140a of the removable cover 20 may be provided with one or more releasable fasteners as described previously to secure the removable cover 20 around the elbow.

It will be appreciated that various heat-producing elements, such as manifolds and turbines may have more complex three-dimensioned surfaces than those heat-producing elements described with reference to FIGS. 2 and 3. Accordingly, various embodiments of thermal insulation covers may be fabricated from a plurality of correspondingly sized and shaped portions of layered thermal insulation system 100 configured to cover adjacent portions of the heat-producing surface. In some embodiments, said plurality of portions may be disposed adjacent one another, in use, to cover adjacent portions of the heat-producing surface. In other embodiments, said plurality of portions may be interconnected, such as by stitching, or be integrally formed therewith.

Figure 4:
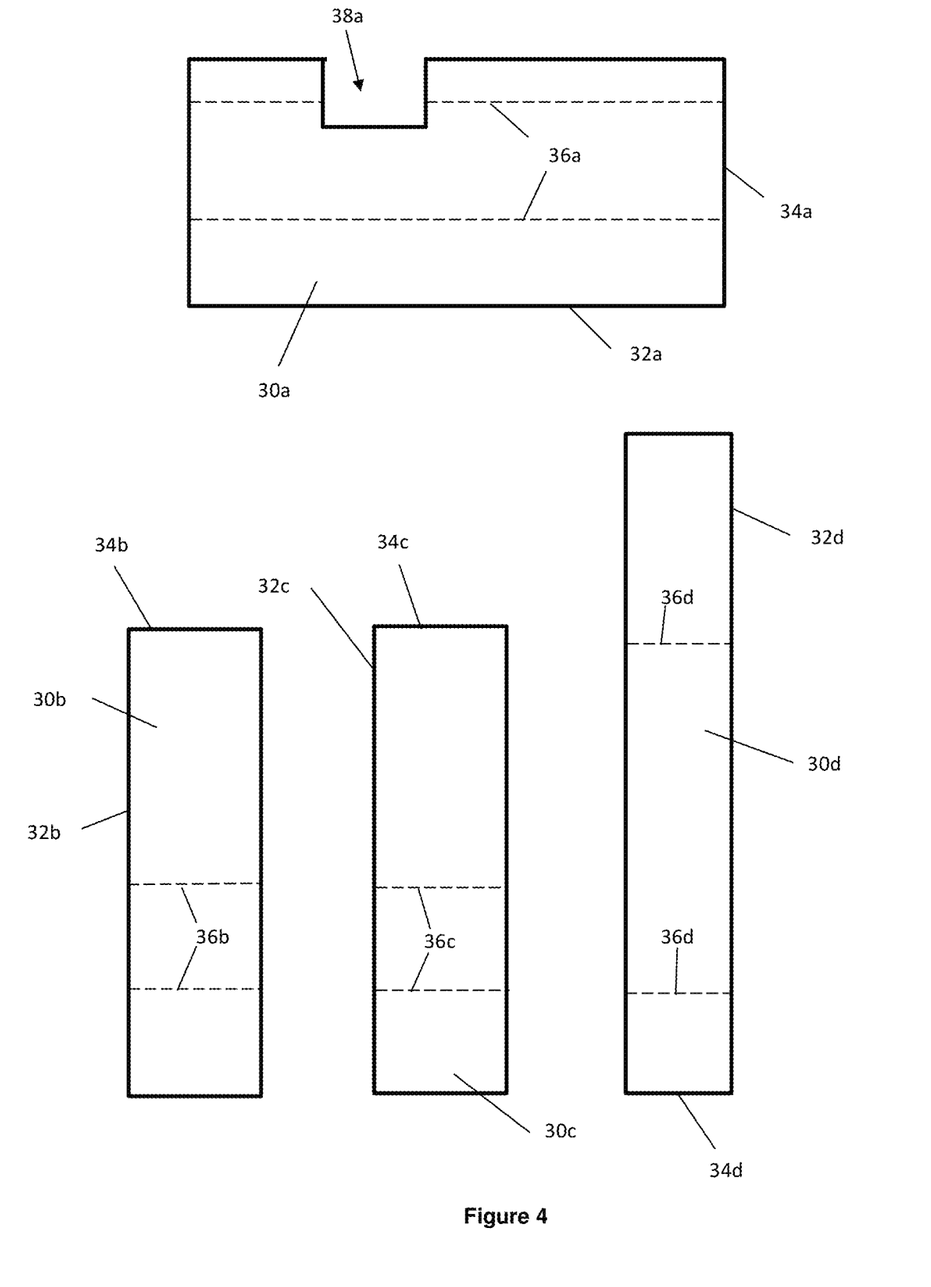
FIG. 4 is a schematic view of a further embodiment of a thermal insulation cover fabricated from the layered thermal insulation system described herein that may be applied to a plurality of adjacent portions of a manifold; and, FIG. 5 is a schematic view of a still further embodiment of a thermal insulation cover fabricated from the layered thermal insulation system described herein that may be applied to at least a portion of a turbine.

For example, as shown in FIG. 4, the thermal insulation cover 30 for a manifold may comprise a plurality of portions 30a-d of layered thermal insulation system 100. Portions 30a-d are elongate rectangular sheets respectively having a pair of opposing parallel longitudinal sides 32a-d and a pair of opposing parallel lateral sides 34a-d substantially perpendicular to respective pairs of longitudinal sides 32a-d.

Portion 30a has a pair of parallel fold lines 36a disposed in parallel alignment with longitudinal sides 32a and a cut out portion 38a in one of longitudinal sides 32a.

Portions 30b-d have a pair of parallel fold lines 36b-d disposed in parallel alignment with lateral sides 34b-d, respectively.

In use, portions 30a-d may be applied to adjacent exposed surfaces of the manifold by folding said portions 30a-d at respective fold lines 36a-d at substantially a right angle to generally correspond to the exposed surfaces of the manifold. It will be appreciated that the portions 30a-d are applied in a manner whereby the first surface 140a of the second reflection layer 140 of each portion 30a-d is exposed. It will also be appreciated that the thermal covers 30 as disclosed herein may not be configured to cover all surfaces of the heat-producing element. In some applications, such as for a manifold, it may only be necessary and/or practicable to cover upper and side surfaces thereof which present an ignition risk.

Figure 5:
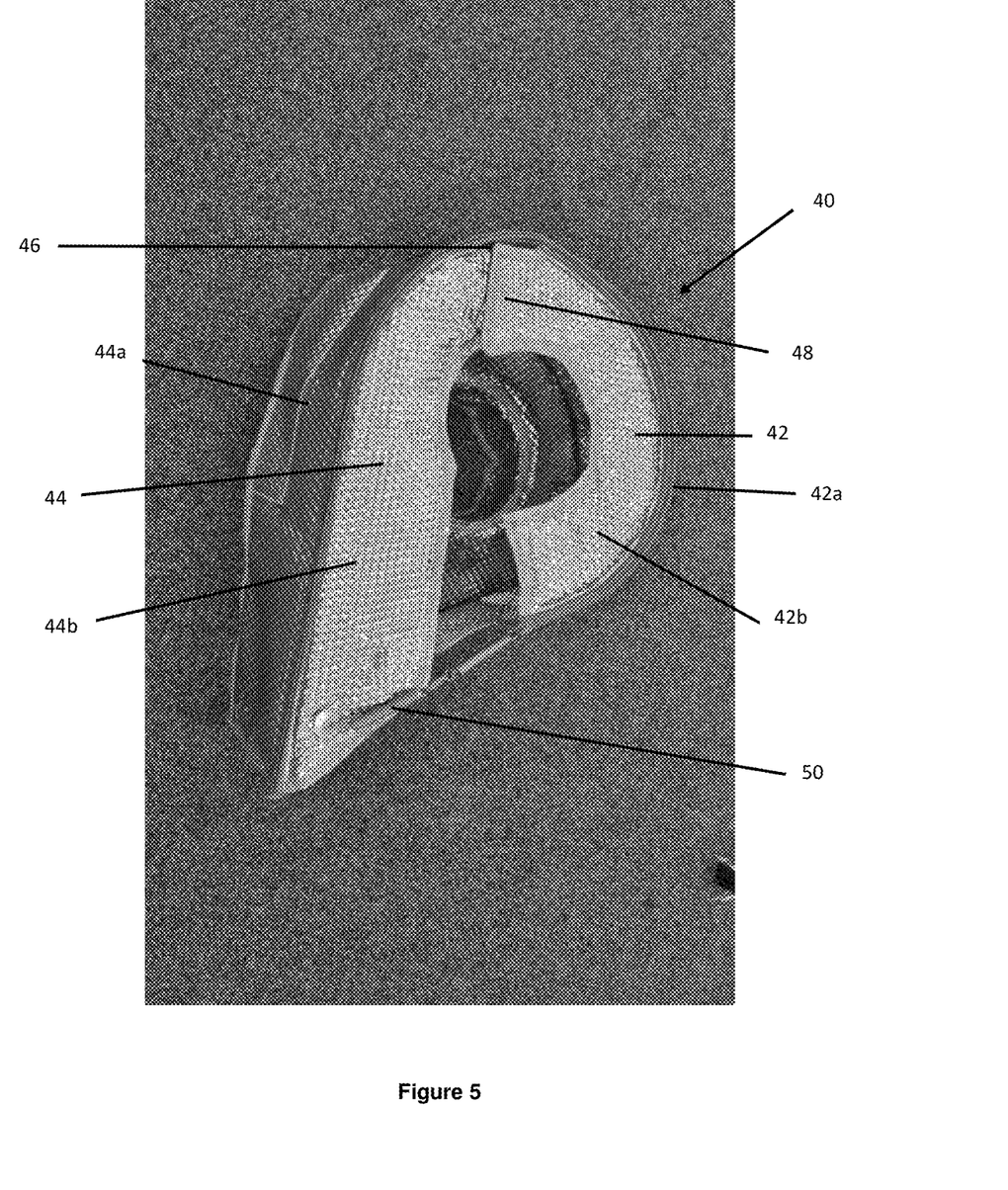

Referring to FIG. 5, the thermal insulation cover 40 for a turbine may take the form of a 'clam shell'. The 'claim shell' includes a generally U-shaped portion 42 interconnected with a generally J-shaped portion 44, optionally provided with a gusset 46 therebetween. The gusset 46 may assist application of said cover 40 to the turbine, allowing an angle between said C- and J-shaped portions 42, 44 to be adjusted as required. It will be appreciated that said portions 42, 44, 46 are fabricated from the layered thermal insulation system 100 as described herein and positioned in respect to the heat producing surface in a manner whereby, in use, the first surface 130a of the first reflection layer 130 is proximal to the heat-producing surface and the first surface 140a of the second reflection layer 140 is exposed.

The C-shaped portion 42 includes an upper wall 42a and a pair of parallel side walls 42b. The upper wall 42a is elongate and rectangular. The side walls 42b are generally C-shaped. Opposing longitudinal edges of the upper wall 42a are fastened to respective long edges of the C-shaped side walls 42b with stitches of heat-resistant thread as described earlier.

The J-shaped portion 44 includes a upper wall 44a and a pair of parallel side walls 44b. The upper wall 44a is elongate and rectangular. The side walls 44b are generally J-shaped. Opposing longitudinal edges of the upper wall 44a are fastened to respective long edges of the J-shaped side walls 42b with stitches of heat-resistant thread as described earlier.

The C-shaped upper portion 42 and the J-shaped lower portion 44 may be interconnected at one end thereof via the gusset 46 with stitching.

The thermal insulation covers 30, 40 as described above may optionally be provided with one or more flaps 48 or wings (not shown) fabricated from the layered thermal insulation system 100 to deflect any leakage of combustible liquids away from the heat-producing equipment and their exposed surfaces. One or more releasable fasteners 50 as described previously may also be provided to secure the removable cover 40 around the turbine.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

For example, the binding 60 applied to edges of the layered thermal insulation system 100 may be stainless steel woven mesh. The stainless steel woven mesh may provide additional rigidity to the thermal covers, improved strength at elevated temperature and assists in lateral thermal conduction.

Additionally, in some alternative embodiments of the thermal covers described herein, the second reflection layer 140 may be covered with stainless steel woven mesh and/or interspersed with sections of reinforced glass fabric coated with an elevated temperature (up to 200° C.) resistant coating, as described previously.

In the claims which follow and in the preceding description except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A layered thermal insulation system, wherein said system is generally conformable to three-dimensional surfaces of heat-producing element to be insulated, whereby, in use, an exposed surface of the layered thermal insulation system has a temperature of less than 150° C. when said surface of said element has a temperature of up to 650° C., the system comprising:
   i) an inner high temperature resistant insulation layer, wherein the inner high temperature resistant insulation layer comprises a woven fibrous material comprising inorganic fibres selected from a group comprising silica fibres, glass fibres, silica glass, e-glass, refractory ceramic fibres, mineral wool fibres or mixtures thereof;
   ii) an outer high temperature resistant insulation layer directly adjacent to and thicker than the inner high temperature resistant insulation layer, wherein the outer high temperature resistant insulation layer comprises a non-woven fibrous material comprising inorganic fibres selected from a group comprising silica fibres, glass fibres, silica glass, e-glass, refractory ceramic fibres, mineral wool fibres or mixtures thereof; and,
   iii) a first reflection layer and a second reflection layer, each of said reflection layers being formed of a non-absorbent metal foil arranged to prevent passage of fluid through aforesaid layers, the first reflection layer being directly adjacent the inner high temperature insulation layer such that, in use, an opposing surface thereof is in close proximity to said surfaces of said element to be insulated, the second reflection layer being directly adjacent the outer high temperature insulation layer such that, in use, an opposing surface thereof comprises said exposed surface,
   wherein respective edges of the first and second reflection layers and the inner high temperature resistant insulation layer are fastened together with stitches of heat resistant thread.

2. The system according to claim 1, wherein the outer high temperature resistant insulation layer may have a density of 250 kg·m$^{-3}$ or less.

3. The system according to claim 1, wherein the outer high temperature resistant insulation layer may have a thermal conductivity of from about 0.13 W/m*K to about 0.03 W/m*K in a temperature range of from 650° C. to 200° C.

4. The system according to claim 1, wherein the outer high temperature resistant insulation layer has a thickness of from about 17 mm to about 24 mm.

5. The system according to claim 1, wherein the inorganic fibres are silica glass fibres.

6. The system according to claim 1, wherein the inner high temperature resistant insulation layer has a thickness of from about 0.77 mm to about 1.3 mm.

7. The system according to claim 1, wherein the inner high temperature resistant insulation layer comprises a reinforced glass fabric.

8. The system according to claim 7, wherein the glass fabric is reinforced with stainless steel wire.

9. The system according to claim 1, wherein the first and second reflection layers are provided with a plurality of protrusions and/or dimples therein.

10. The system according to claim 9, wherein the plurality of protrusions and/or dimples have a diameter of from about 7 mm to about 12 mm and a height/depth of from about 2 mm to about 3 mm.

11. The system according to claim 9, wherein the plurality of protrusions and/or dimples extends continuously across said reflection layers at a density of from 5,000 protrusions and/or dimples to 10,000 protrusions and/or dimples per square metre.

12. The system according to claim 1, wherein the first and second reflection layers and the inner high temperature resistant insulation layer each have a width and a length exceeding that of the outer high temperature resistant insulation layer.

13. The system according to claim 12, wherein the first and second reflection layers and the inner high temperature resistant insulation layer extend beyond each edge of the outer high resistant insulation layer by an amount sufficient for the first and second reflection layers and the inner high temperature resistant insulation layer to be fastened together.

14. A thermal insulation product fabricated from the layered thermal insulation system according to claim 1, when used as a removable cover for an element of heat producing equipment.

* * * * *